March 21, 1961  E. FURMAN ET AL  2,975,446
AUTOMOBILE TIRE WASHER
Filed May 21, 1958  3 Sheets-Sheet 1

INVENTOR.
E. FURMAN
D. CHORNE
M. CHORNE
BY
ATTORNEY

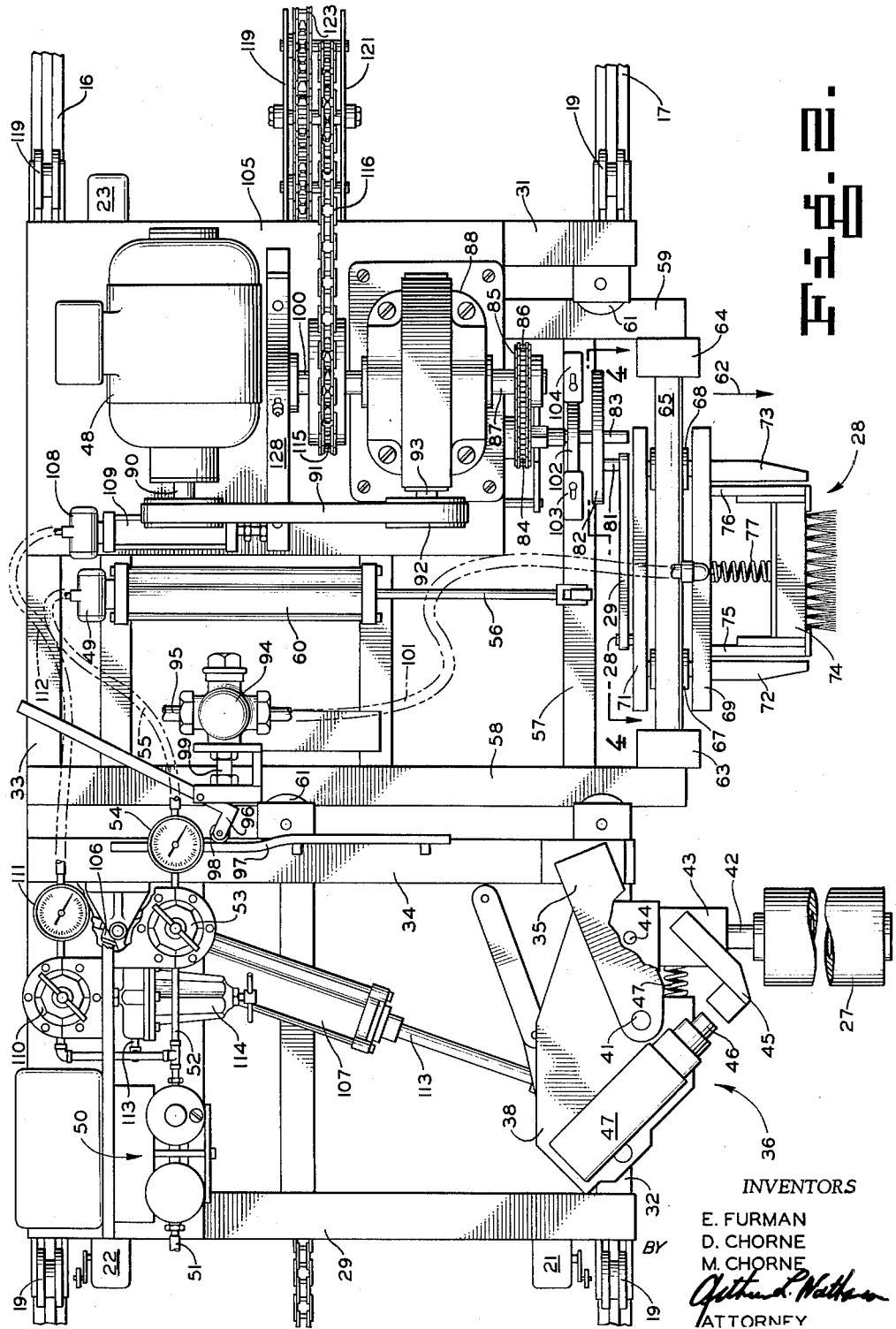

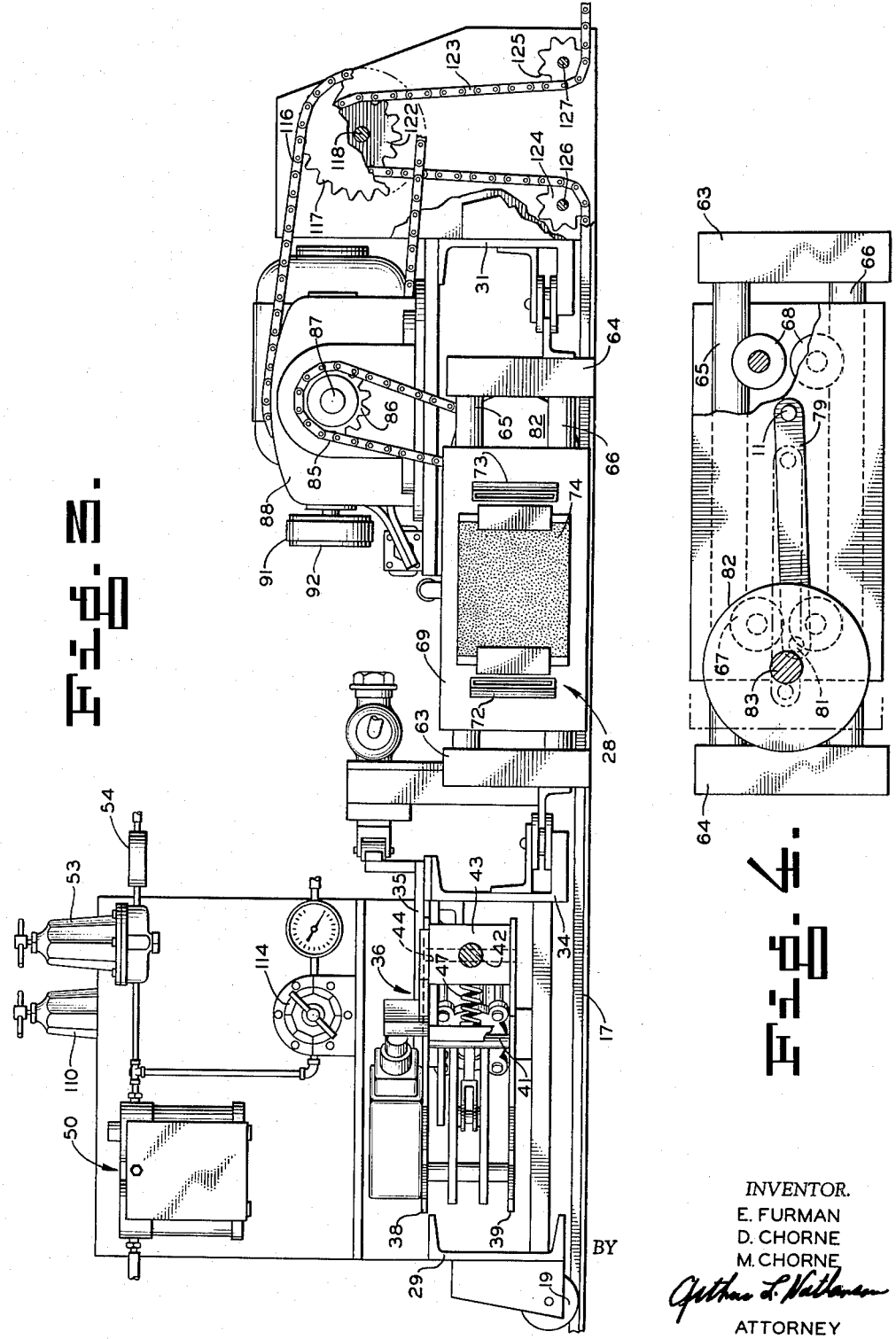

United States Patent Office 2,975,446
Patented Mar. 21, 1961

2,975,446

AUTOMOBILE TIRE WASHER

Edward Furman, 122 N. Hewlett Ave., Merrick, N.Y., and Daniel Chorne, 109 Pine St., and Martin Chorne, 119 Pine St., both of Freeport, N.Y.

Filed May 21, 1958, Ser. No. 736,889

4 Claims. (Cl. 15—21)

The present invention relates to washing devices and more particularly to a mechanism for washing the outer side walls of automobile tires.

In the commercial automobile washing establishment the automobiles are conveyed along a predetermined path where various washing and cleaning operations are performed. One of the more difficult cleaning operations is that of washing the outer side walls of the four tires. Very often this washing step is performed by attendants located on each side of the path of travel of the automobile. The attendants will manually wash the side walls of the tires as the automobiles are conveyed along. The obvious disadvantages of such a manual system has led to the development of certain washing devices designed to perform this operation. Because it is disadvantageous to stop each automobile to wash the tire sides, there has been developed a tire washer which is mounted on a carriage to travel along with the automobile as the tire side wall is being washed. This type of tire washer is well known and in general comprises a carriage adapted to roll along a track located on each side of the path of automobile conveyance. The carriage starts from a rearward or initial position at which it commences to wash the tire. As the automobile and carriage move forward the tire is cleaned by a brush mounted on the carriage which is brought into contact with the tire side wall. These machines of the prior art rely upon the movement of the rotating automobile tire in contact with a rotating brush and stationary nozzles, to effect the cleaning operation. However experience has shown that the tire sides are only partially cleaned in this manner and that the dirt and grit adhering to the tire side walls is only imperfectly removed as the rotating tire passes along the brush. This is one of the principal disadvantages of prior machines of this type that the present invention has been designed to overcome. In addition, certain design features of the prior art machines such as a reliable and convenient carriage return mechanism and carriage conveyance and control arrangements have presented functional problems which the present invention is also designed to overcome.

Accordingly an object of the present invention is to provide an improved mechanism for washing the side walls of automobile tires.

Another object of the present invention is to provide an improved automobile tire washing device which is wholly automatic in operation.

Another object of the present invention is to provide an automobile tire washing device of the traveling carriage type which thoroughly cleans and washes the tire side walls.

Another object of the present invention is to provide an automobile tire washing device wherein a thorough scrubbing action against the tire side walls is obtained.

A further object of the present invention is to provide a tire side wall cleaning device wherein fluid nozzles are oscillated back and forth adjacent the tire side walls to effect a more thorough cleaning thereof.

A further object of the present invention is to provide a tire side wall cleaning device wherein a brush is brought into contact with the tire sides and a scrubbing action is obtained while the automobile travels along a predetermined path.

A still further object of the present invention is to provide a tire washing device wherein a brush and fluid nozzles are oscillated over the sides of an automobile tire to provide a thorough cleaning action.

A still further object of the present invention is to provide an automobile tire washing device of the traveling carriage type wherein the carriage is conveyed along at the same speed as the automobile by a control arm which contacts the automobile during the travel of the carriage and is then automatically retracted to permit the return of the carriage to its initial or standby position.

A still further object of the present invention is to provide an automobile tire washing device of the traveling carriage type wherein the carriage is returned from its advance position to its rearward or standby condition by an improved means which is reliable and certain in operation.

In accordance with these and other objects, the present invention contemplates a washing device mounted on a traveling carriage which in turn rolls along a track positioned on one side of the path along which an automobile is conveyed in a commercial car washing establishment. An additional tire washing device of identical construction is similarly mounted on a carriage which is located on the opposite side of the automobile conveyance path. As is well understood, the automobile to be washed is conventionally conveyed along by a conveyor chain located on the floor of the establishment to which short tow lengths are hooked. This chain conveyor is continuous so that the automobile need not be stopped as it passes through the various washing operation points. The track along which the traveling carriage moves is of course parallel to that of the automobile and extends along a short distance thereof. The carriage has a rearward or initial position at which point it remains until contacted by the tire of an automobile. Then as the automobile continues in its path, the carriage is similarly propelled along for a short interval during which the tire is washed. At the extreme forward position or point of travel of the carriage, a release mechanism operates to disengage the carriage from the automobile. At this time a carriage return mechanism returns the carriage in a rearward direction back toward its standby or initial point while the automobile continues along its conveyed path.

There is mounted on the carriage a washing head which comprises a mount for a pair of fluid nozzles and a brush. This washing head is selectively reciprocated laterally of the carriage path at the initiation of the washing operation. As the washing head moves forward the brush contacts the side wall of the tire and the nozzles are located adjacent thereto. A fluid source consisting of steam and soap is connected by flexible hoses to the nozzles so that this fluid under pressure is directed against the tire side walls. At the same time that the washing head is brought into contact with the tire a washing motor is energized which by means of an eccentric causes the washing head to rapidly oscillate so that the brush and the nozzles move in a back and forth motion against the tire walls. This is a particularly important feature of the present invention in that it is this movement that effects a far more thorough cleansing operation than has been heretofore obtained in this type of mechanism. It is readily understood that this oscillating of the washing head results in multiple passes of the nozzles and brush over each portion of the tire side wall. In machines of the prior art there was only one such pass which was due to the movement of the rotating tire. However in the present machine there is not only the movement of the rotating tire but also the rapid movement of the brush and nozzle to result in a complete cleaning of the grit and dirt adhering to the tire. The speed of oscillation of the washing head is such that its linear movement is at a higher speed than the linear movement of the tire thereby insuring that each portion of the tire side wall receives a number of passes of the brush and nozzles. When the carriage reaches its extreme forward position, a switch is actuated which through a novel electrical and mechanical mechanism returns the carriage to is rearward standby position.

The various novel features of the present invention will become apparent from the following description of a specific embodiment thereof taken with the drawings in which:

Fig. 2 is a plan view of the tire washing mechanism;

Fig. 4 is a sectional view taken on the line 4—4 of Fig. 2; and

Fig. 5 is a wiring diagram illustrating the electrical control elements of the present invention.

Figure 1:
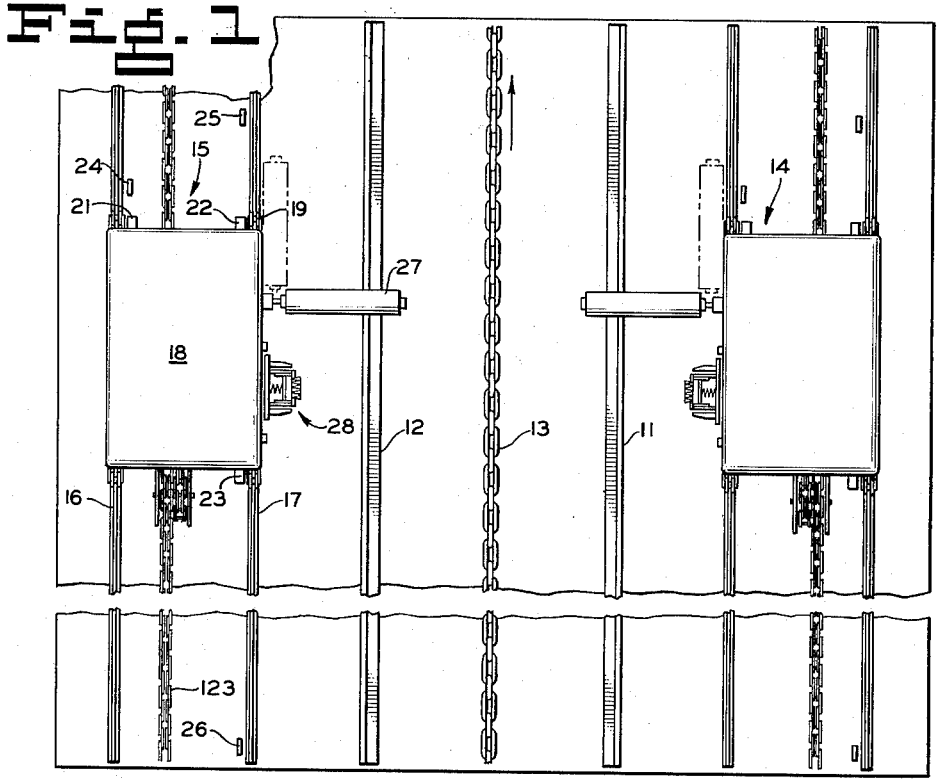
Fig. 1 is a plan view of a portion of a commercial car washing establishment showing the locations of the tire washing mechanism of the present invention.

Referring now to the drawings and more particularly to Fig. 1, numerals 11 and 12 represent tracks along which an automobile is conveyed in a commercial car washing establishment. A continuous conveyor chain 13 is located on the floor between the tracks 11 and 12. Each car is hooked to the conveyor 13 by means of a short tow length which is hooked onto the car in a known manner. As the car is thus towed along its path the various washing and cleaning operations are performed. At a point in this path, the outer side walls of the tires are cleaned by the tire washing mechanisms generally indicated by numerals 14 and 15. Each of these mechanisms is of identical construction and hence the details of one will be herein described. A pair of parallel carriage tracks 16 and 17 are located adjacent the automobile path. These tracks may be T shaped in cross section and serve to guide a carriage 18 along its path parallel to the movement of the automobile. The carriage is supported by four rollers 19 which ride on the carriage tracks 16 and 17. To control the movement of the carriage, a plurality of microswitches 21, 22 and 23 are secured to the carriage frame as shown. These microswitches are operated by stationary pins 24, 25 and 26 respectively which are mounted to the floor in the positions shown. A control arm 27 extends laterally from the carriage 18 in the path of a tire rolling along the automobile track 12. As seen in Fig. 1, the carriage is in an intermediate position and the control arm is extended whereby it is engaged by an automobile tire. When this engagement takes place, and the automobile continues along its path it is seen that the carriage 18 will similarly be conveyed or pushed forward along its parallel path. As the carriage progresses from its normal position to its forward position, the cleaning operation takes place. As will become apparent hereinafter, the engagement of the tire with the control arm 27 causes the washing head 28 to move laterally of the direction of the automobile tire to effect the cleaning thereof. When the carriage reaches its extreme forward position, microswitch 22 is engaged by its actuating pin 25 whereupon the control arm 27 is quickly retracted to the dotted line position shown. It is seen from that this effects a disengagement of the arm and automobile tire so that the automobile will continue along its path without carrying the carriage 18 any further. At this point in the operation a return mechanism is brought into operation and the carriage is propelled rearward in the direction of its standby location. When the microswitch 23 on the carriage engages the actuating pin 26, the rearward travel of the carriage ceases and the carriage is prepared to receive the next automobile tire.

It can be seen that during the rearward travel of the carriage 18, were the subsequent tire close to the preceding one it might pass by the carriage before the latter reaches its rearward position because the control arm 27 is retracted. To provide against this possibility of a tire getting by without being cleaned, the contact pin 24 which may be located approximately three feet from the contact pin 25 engages microswitch 21 which as will become apparent hereinafter serves to condition the mechanism for a subsequent washing operation. That is, the actuation of microswitch 21 causes control arm 27 to reextend to the solid line position wherein it will be engaged by the subsequent tire.

Figure 3:
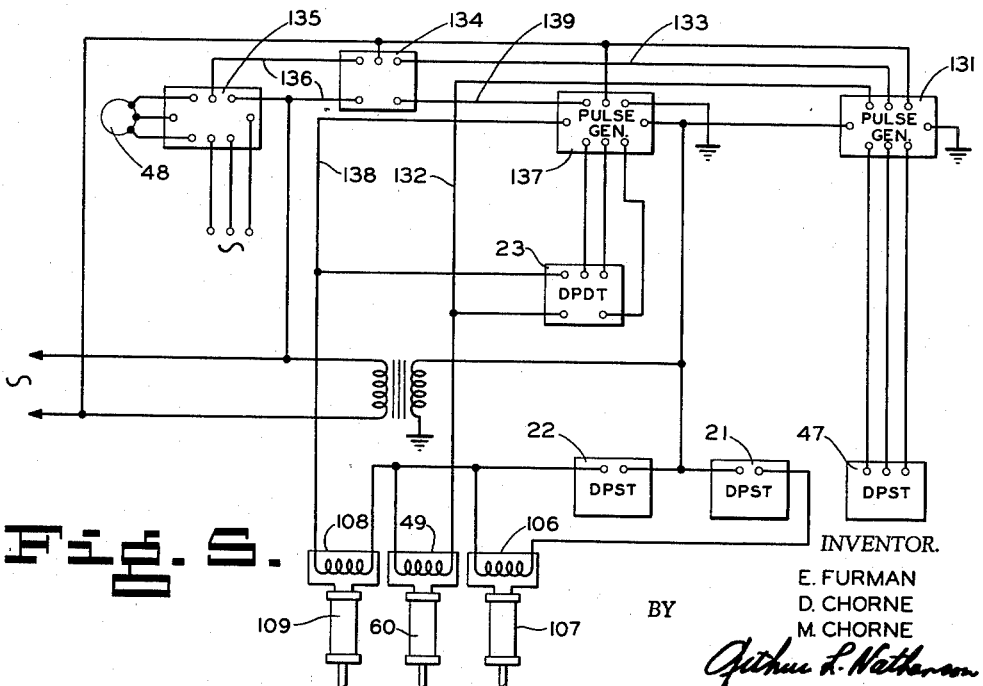
Fig. 3 is a side elevation of the mechanism of Fig. 2.

The details of the carriage and tire washing mechanism mounted thereon will now be considered by reference to Figs. 2, 3 and 4. A rectangular framework comprising members 29, 31, 32 and 33 along with a cross frame member 34 serves as a carriage base. The four rollers 19 are secured to the underside of this framework to support the carriage upon its tracks 16 and 17. A support arm 35 is secured to the cross frame member 34 in any convenient manner such as by welding and serves to support a control block 36. This block comprises plate members 38 and 39 which are pivotally mounted by pin 41 passing through the support member and plates. The control arm 27 is rotatably mounted to shaft 42 which is received by member 43. The latter is pivotally mounted by pin 44 and serves to support an actuator 45 which is positioned to engage an actuating pin 46 of a microswitch 47. The block 43 and the control arm 27 is urged to an extended position by a compression spring 47. It is seen then that when a tire of an automobile engages the control arm 27 it will pivot around pin 44 until the actuator 45 engages pin 46 at which time the microswitch 47 will close. As will become apparent hereinafter from a description of the electrical circuit of the present invention, the actuation of microswitch 47 results in the energization of motor 48 and of a solenoid valve 49.

A conduit 51 is adapted to be connected to a pneumatic source. The conduit leads through an air filter 50 which may be of conventional construction. The path of air may then be traced through an air conduit 52 an air pressure regulator 53, air pressure gauge 54, flexible hose 55 to the solenoid valve 49. Upon actuation of the solenoid valve, air is directed to the rear end of pneumatic cylinder 60 to extend the piston extension rod 56 which in turn connects to a frame member 57. The member 57 along with frame members 58 and 59 serve as a framework for the laterally movable washing assembly. This framework is located between rollers 61 which are mounted to the carriage cross frames 31 and 34. Thus as piston extension rod 57 is extended by the actuation of pneumatic cylinder 60, the entire framework comprising members 57, 58 and 59 will reciprocate laterally in the direction of arrow 62. The frame members 58 and 59 serve to support the vertical members 63 and 64 respectively which in turn serve as mounts for horizontal tracks 65 and 66. The washing head 28 is mounted on a pair of rollers 67 and 68 which ride between the washing head tracks 65 and 66. The axles which support rollers 67 and 68 are received in plates 69 and 71 to provide a rigid framework for the washing head 28. Plate 69 serves to mount a pair of nozzles 72 and 73 along with a spring mounted brush 74. The latter is received in tracks 75 and 76 and urged laterally outward by a compression spring 77. A pin 78 is secured to the inner surface of plate 71 and receives an eccentric arm 79 the other end of which is received by an eccentric pin 81 mounted to an eccentric disc 82. This disc is securely mounted on the outer round portion of shaft 83 which also mounts a sprocket 84 at the inner portion thereof. A chain 85 encircles sprocket 84 and another sprocket 86 mounted on a shaft 87 of gear box 88. As motor 48 rotates, its shaft 90 drives a pulley 89 encircled by a belt 91 which also encircles a pulley 92 mounted to the shaft 93 of the gear assembly 88. It is seen then that the rotation of motor 48 will drive the eccentric disc 82 to impart an oscillating movement to the washing head 28 which will travel in a back and forth motion between the washing head tracks 65 and 66.

Thus as the microswitch 47 is actuated by an automobile tire engaging the control arm 27, the washing head assembly 28 is reciprocated laterally of the carriage by cylinder 60 and also the motor 48 is energized to oscillate the washing head. At the same time that the washing head is reciprocated outwardly in the direction of the automobile tire, a steam valve 94 adapted to be connected to a source of steam by conduit 95, is opened by means of a steam valve actuating arm 96 which rides along an offset track 97. It is understood that as the roller 98 passes the offset in track 97, a rod 99 will be pushed inwardly of the steam valve 94 to permit steam connected to conduit 95 to pass through the valve and through a flexible steam hose 101 to the steam nozzles 72 and 73. This source of steam is preferably mixed with a soap or detergent which is emitted under pressure through the nozzles 72 and 73 against the side walls of a tire being washed. It should be particularly noted that as this saponified steam is expelled from the nozzles both the nozzles and the brush 74 are oscillated back and forth to make a number of passes over each section of the rotating automobile tire. It is understood that the sprocket 84 is slidably mounted to the inner square portion of shaft 83 so that the sprocket may be maintained in its fixed position while the shaft and its associated mechanism is permitted to extend laterally of the washing carriage. The shaft 83 is received in a bearing 102 which is mounted in place by bearing mounts 103 and 104. Thus the motor 48 and gear box 88 are mounted on a plate 105 and do not extend laterally of the carriage but through the sliding movement between sprocket 84 and shaft 83, the washing head mechanism is permitted to extend laterally and at the same time maintain engagement with the gear box shaft 83. The eccentric arm 79 as more clearly seen in Fig. 4, imparts an oscillating movement as it travels from the solid line position to the dotted line position to effect the back and forth motion of the washing head 28.

It is understood then that the sequence of operations above described occur as an automobile tire engages the control arm 27 at the initial or normal position of the washing assembly carriage. As the automobile and carriage continue along their paths, the washing operation takes place. When the carriage reaches its extreme forward position, the microswitch 22 engages its actuating pin 25 which through an electrical circuit to be described actuates (1) a solenoid valve 106 of a pneumatic cylinder 107, (2) a solenoid valve 108 of a pneumatic cylinder 109 and (3) a solenoid valve 49 of pneumatic cylinder 60. The source of air from conduit 51 may also be traced through a pressure regulating valve 110, a pressure gauge 111 and a flexible air hose 112 to the solenoid valve 108. Similarly the air source may be traced through a conduit 113, a pressure valve 114 to the solenoid valve 106. As valve 106 actuates, the pneumatic cylinder 107 will retract its piston arm 113 to pivot block 36 in a clockwise direction as seen in Fig. 2. As the block 36 pivots the control arm 27 is retracted to its dotted line position as shown in Fig. 1. Thus the forward movement of carriage 15 by the automobile tire is arrested and the return movement of the carriage is permitted by a mechanism that is hereinafter to be described. Also, the cylinder 60 retracts the washing head mechanism to its standby position at this time.

An output shaft 100 extending from the gear box 88 supports a sprocket 115 encircled by a chain 116 which also encircles a sprocket 117 mounted on shaft 118. The latter is maintained in place by a pair of vertically mounted plates 119 and 121 secured to the carriage frame. The shaft 118 also mounts a sprocket 122 which is engaged by a chain 123 which as seen in Fig. 1 extends the full length of the carriage tracks and is secured at each end to the floor of the washing establishment. Chain 123 is also engaged by a pair of idler sprockets 124 and 125 secured to shafts 126 and 127 respectively. The shaft 100 is controlled by an overrunning clutch mechanism 128 which is controlled by the pneumatic cylinder 109. The pneumatic cylinder is actuated as pointed out above by microswitch 22 at the extreme forward end of travel of the carriage 115 to engage the overrunning clutch 128 which thereupon rotates the chain 116. This results in the rotation of sprocket 122 to return the carriage rearwardly to its initial or standby condition. It is understood that during the forward travel of the carriage during the washing operation the clutch 128 is disengaged. The clutch itself is a commercially available device of any suitable conventional construction and hence the details thereof are not herein described. Also, it should be noted that the motor 48 serves the dual function of returning the carriage to the normal position and also oscillating the washing head. In this regard, it should be understood that other means and mechanism could be employed to oscillate the washing head. For example, an additional pneumatic cylinder could be provided with an extension arm linked to the washing head in place of the eccentric shown in the embodiment of the drawings.

As previously mentioned, if the succeeding automobile tire is close to the preceding washed tire, the former may pass the washing assembly carriage during its rearward travel since the control arm 27 is retracted. To provide against this possibility, microswitch 21 is actuated by its pin 24 after the carriage has progressed rearwardly a distance of approximately three feet from the extreme forward position. The actuation of microswitch 23 will actuate the pneumatic solenoid valve 106 to extend the piston rod 113 thereby pivoting the control arm block 36 in a counterclockwise direction to reextend the control arm 27. Thus a succeeding tire will engage the extended control arm 27 as the carriage is moving rearwardly toward its normal position and the washing cycle above discussed will recommence. Also, as a tire engages the control arm 27 before the carriage returns to its normal position, solenoid valve 108 is actuated to disengage the clutch mechanism 128 by means of pneumatic cylinder 109. If the succeeding automobile tire does not engage the extended control arm 27, the carriage will continue to travel rearward to its normal or standby condition at which time microswitch 23 will engage its actuating pin 26. The actuation of switch 23 serves to deenergize motor 48 and also the solenoid valve 108 which in turn arrests the backward motion of the washing carriage through the overrunning clutch 128.

The electrical circuit of the system will now be described with reference to Fig. 5. The assembly will be considered in its initial or start position. That is the carriage is retracted, the control arm 27 is extended and the motor 48 is deenergized. As the front wheel of an automobile makes contact with the control arm 27 microswitch 47 is actuated. Switch 47 controls a pulse generator 131 which may be of any conventional construction and is therefore shown herein in block form. It is contemplated that the pulse generator may be of the type wherein a condensor is charged during a normal or standby condition and discharged to provide a short pulse when operated. Thus the actuation of switch 47 will cause a pulse from generator 131 which may be traced over wire 132 through the solenoids 49 and 108. The solenoid 49 as above discussed operates the washing head cylinder 60 to advance the washing assembly slide laterally into tire washing position. The solenoid 108 operates the cylinder 109 to disengage the clutch mechanism 128. At this point in the operation the pulse generator also supplies a short impulse over wire 133 to a latch relay 134 which thereupon latches up and holds a magnetic switch 135 operated to which it is connected over wires 136. The magnetic switch 135 serves to start the motor 48 which it is recalled oscillates the washing assembly head to scrub the automobile tire. When the carriage reaches its extreme forward position, microswitch 22 is actuated to energize the solenoid valve 106 thereby retracting the control arm to release the carriage from the automobile tire. Microswitch 22 also actuates the solenoid 49 so that the washing head is retracted by the pneumatic cylinder 60. Also, solenoid 108 is energized to engage the overrunning clutch 128 by means of the pneumatic cylinder 109 so that the return mechanism for the carriage is brought into operation. When the microswitch 21 is operated during the return movement of the carriage, the solenoid 106 is energized to reextend the control arm as described above so that the next succeeding tire will reinitiate the washing cycle. If the control arm is not reengaged during the rearward motion or travel of the carriage, microswitch 23 will be actuated at the extreme rearward position. This serves to operate a pulse generator 137 to provide a momentary impulse to the solenoid 108 over wire 138 to disengage the clutch and thereby arrest the rearward movement of the carriage. Also an impulse from the pulse generator 137 is transmitted by wire 139 to the latch relay 134 which in turn releases the magnetic switch 136 to stop the motor 48. The machine has now completed a full cycle and is ready for the next automobile tire.

Although the invention has been described with respect to a specific embodiment thereof it is understood that various modifications may be made without departing from the spirit and scope of the invention as set forth in the appended claims. In particular it has been found that while it is highly desirable to oscillate both the brush and the nozzles, a somewhat satisfactory result may be obtained by oscillating either while the other is maintained stationary. That is the nozzles need not be mounted on an oscillating washing head but may be fixedly mounted while the brush oscillates back and forth across the side of the automobile tire. Similarly a somewhat satisfactory washing may be obtained by fixedly mounting the brush while the nozzles are oscillated back and forth over the tire sides. However, as described above optimum results are obtained when both the nozzles and the brush are mounted to oscillate.

What is claimed is:

1. An automobile tire washing system of the character described wherein an automobile is conveyed along a predetermined path, track means located on each side of said path, a carriage located on each of said track means and adapted to travel therealong from a normal position to a terminating position, tire washing means mounted on said carriage, control arm means extending therefrom in the path of an advancing automobile and adapted to be engaged by a tire thereof whereby said carriage is propelled along the track means as an automobile tire passes the carriage normal position, means to retract said control arm means when the carriage reaches the terminating position, means whereby said carriage is propelled backward from the said terminating position, said last named means comprising means located adjacent the said track means and extending from said normal carriage position to said terminating carriage position, rotatable means located on said carriage and engaged with said means located adjacent the said track means, motor means mounted on said carriage, means including clutch means on said carriage interconnecting said rotatable means nad motor means whereby said carriage is selectively driven rearward to the normal position.

2. An automobile tire washing system of the character described wherein an automobile is conveyed along a predetermined path, track means located on each side of said path, a carriage located on each of said track means and adapted to travel therealong from a normal position to a terminating position, tire washing means mounted on said carriage, control arm means extending therefrom in the path of an advancing automobile and adapted to be engaged by a tire thereof whereby said carriage is propelled along the track means as an automobile tire passes the carriage normal position, means to retract said control arm means when the carriage reaches the terminating position, means whereby said carriage is propelled backward from the said terminating position, said last named means comprising chain means located adjacent the said track means and extending from said normal carriage position to said terminating carriage position, sprocket means located on said carriage and engaged with said chain means, motor means mounted on said carriage, means including clutch means on said carriage interconnecting said sprocket means and motor means whereby said carriage is selectively driven rearward to the normal position and means operable at a predetermined point between the normal and terminating positions of the carriage to reextend said control arm means.

3. In an automobile tire washing system of the character described including means to convey an automobile along a predetermined path, track means located on each side of said path and parallel therewith, a carriage located on each of said track means and adapted to travel therealong, each carriage having a control arm extending therefrom into the path of an advancing automobile and adapted to be engaged thereby to propel the carriage along said track means, an improved tire washing assembly supported by said carriage comprising fluid conduit means, a washing head including nozzle means and brush means, said nozzle means being connected to one end of the conduit means; said washing head assembly including a plurality of washing head tracks generally horizontally arranged and parallel to the line of movement of an advancing automobile, a pair of plates having thereon a plurality of rollers therebetween engaging said washing head tracks; said brush means being mounted upon one of said plates, a rotating driving disk having an eccentrically mounted pin, and an arm interconnecting said pin and said assembly for imparting reciprocating rectilinear movement to said washing head assembly along a line of movement parallel to said washing head tracks, and means for selectively moving said washing head assembly to contact the side walls of successive tires during the period of reciprocating movement.

4. In an automobile tire washing system of the character described including means to convey an automobile along a predetermined path, track means located on each side of said path and parallel therewith, a carriage located on each of said track means and adapted to travel therealong, each carriage having a control arm extending therefrom into the path of an advancing automobile and adapted to be engaged thereby to propel the carriage along said track means, an improved tire washing assembly supported by said carriage comprising fluid conduit means, a washing head including nozzle means and brush means, said nozzle means being connected to one end of the conduit means; said washing head assembly including washing head track means generally horizontally arranged and parallel to the line of movement of an advancing automobile, plate means having thereon roller means engaging said washing head track means, said brush means being mounted upon said plate means, a rotating driving disk having an eccentrically mounted pin and an arm interconnecting said pin and said assembly for imparting reciprocating rectilinear movement to said washing head assembly along a line of movement parallel to said washing head track means, and means for selectively moving said washing head assembly to contact the side walls of successive tires during the period of reciprocating movement.

References Cited in the file of this patent

UNITED STATES PATENTS

| | | |
|---|---|---|
| 1,718,695 | Lacy | June 25, 1929 |
| 1,823,222 | Whitsitt | Sept. 15, 1931 |
| 2,242,692 | Yingling | May 20, 1941 |
| 2,692,214 | Hurst | Oct. 19, 1954 |
| 2,814,825 | Guthrie et al. | Dec. 3, 1957 |
| 2,837,759 | Haverberg | June 10, 1958 |
| 2,857,605 | Weishaar | Oct. 28, 1958 |